United States Patent
Bergstrom et al.

(10) Patent No.: US 6,384,125 B1
(45) Date of Patent: May 7, 2002

(54) CHEMICALLY MODIFIED SILICA FILLERS, PROCESS FOR PRODUCING, AND SILICONE COMPOSITIONS CONTAINING SAME

(75) Inventors: Debora Frances Bergstrom, Midland; Lisa Marie Boswell, Auburn; Mark David Fisher; James Richard Hahn, both of Midland, all of MI (US); Timothy A. Okel, Trafford, PA (US); Clifford Carlton Reese, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/637,953

(22) Filed: Aug. 11, 2000

Related U.S. Application Data

(60) Provisional application No. 60/203,427, filed on May 10, 2000, provisional application No. 60/203,428, filed on May 10, 2000, provisional application No. 60/203,442, filed on May 10, 2000, provisional application No. 60/172,308, filed on Dec. 17, 1999, provisional application No. 60/172,309, filed on Dec. 17, 1999, provisional application No. 60/156,861, filed on Sep. 30, 1999, provisional application No. 60/149,758, filed on Aug. 19, 1999, provisional application No. 60/149,755, filed on Aug. 19, 1999, and provisional application No. 60/149,757, filed on Aug. 19, 1999.

(51) Int. Cl.$^7$ .............................................. C08K 3/34
(52) U.S. Cl. ................................... 524/492; 523/213
(58) Field of Search .......................... 523/213; 524/492

(56) References Cited

U.S. PATENT DOCUMENTS

| | | | |
|---|---|---|---|
| 3,714,068 A | | 1/1973 | Miller et al. ................. 252/358 |
| 3,948,676 A | | 4/1976 | Laufer ........................ 106/309 |
| 4,292,198 A | * | 9/1981 | Gerritsen ..................... 252/428 |
| 4,530,912 A | * | 7/1985 | Pullukat ...................... 502/104 |
| 5,006,619 A | * | 4/1991 | Pullukat ...................... 526/128 |
| 5,009,874 A | | 4/1991 | Parmentier et al. .......... 423/335 |
| 5,116,886 A | | 5/1992 | Wolff et al. .................. 523/209 |
| 5,908,660 A | | 6/1999 | Griffith et al. .............. 427/220 |
| 6,051,672 A | | 4/2000 | Burns et al. .................. 528/10 |

FOREIGN PATENT DOCUMENTS

DE         0 798 348     10/1997

* cited by examiner

*Primary Examiner*—Paul R. Michl
(74) *Attorney, Agent, or Firm*—Jennifer Warren; Catherine Brown

(57) ABSTRACT

This invention is a process for making modified silica filler comprising the steps of:

(A) contacting an acidic aqueous suspension of precipitated or colloidal silica, optionally in the presence of a surfactant and/or a water-miscible solvent, with a combination of (a) a functionalizing coupling agent, and (b) an organometallic hydrophobing compound in a weight ratio of (a) to (b) of at least 0.001 to 1 to form an acidic aqueous suspension of chemically treated silica filler having a pH of 2.0 or less (B) treating the acidic aqueous suspension of the chemically treated filler with an acid-neutralizing agent to increase the pH of the suspension to a range of from greater than 2.0 to 10, and (C) recovering the chemically treated filler.

This invention is also modified silica filler that has a pH of from about 5.0 to 10.0, where the silica filler is made by the method of this invention. This invention is also a curable silicone elastomer composition comprising a polyorganosiloxane, the modified silica filler produced by the method of this invention, and a means of curing the polyorganosiloxane into an elastomer.

28 Claims, No Drawings

CHEMICALLY MODIFIED SILICA FILLERS, PROCESS FOR PRODUCING, AND SILICONE COMPOSITIONS CONTAINING SAME

This application claims the benefit of U.S. provisional applications Ser. No. 60/203,427, filed May 10, 2000, Ser. No. 60/203,428, filed May 10, 2000, Ser. No. 60/203,442, filed May 10, 2000, Ser. No. 60/172,308, filed Dec. 17, 1999, Ser. No. 60/172,309, filed Dec. 17, 1999, Ser. No. 60/156,861, filed Sep. 30, 1999 Ser. No. 60/149,758, filed Aug. 19, 1999, Ser. No. 60/149,755, filed Aug. 19, 1999, and Ser. No. 60/149,757, filed Aug. 19, 1999.

BACKGROUND OF THE INVENTION

The present invention relates to chemically modified silica fillers, methods for making chemically modified silica fillers, and the use of such silica fillers in polymeric compositions, especially silicone compositions. Most particularly, this invention relates to a process for producing a functionalized and hydrophobed silica filler, hereinafter referred to as modified silica filler.

The modified silica fillers prepared by the present method are useful in many applications where fumed silicas, precipitated silicas, colloidal silicas, and silica gels are useful. However, the modified silica fillers prepared by the present method are particularly useful as reinforcing and extending fillers in organic rubbers and silicone rubber compositions including silicone adhesives, rubbers, coatings, foams, and sealants. It is well known that cured silicone compositions, such as silicone rubbers, formed from the curing of polydiorganosiloxane fluids and gums alone generally have poor elongation and tensile strength properties. One means for improving the physical properties of such silicone compositions involves the incorporation of silica filler into the fluid or gum prior to curing. However, such silicas typically contain hydroxyl functionalities that cause the silicas to be hydrophilic. Such hydrophilic silicas are difficult to incorporate into silicone compositions comprising hydrophobic polydiorganosiloxane polymers and further cause the silica to react with the polymers causing a phenomenon typically referred to as "crepe hardening". A great deal of effort has been made in the past to treat the surface of aggregated reinforcing silica fillers with organosilanes or organosiloxanes to make the surface of the silica hydrophobic. This surface treatment reduces or diminishes the tendency of the silicone compositions to crepe harden and improves the physical properties of the cured silicone compositions.

Various coupling agents, e.g., titanates, zirconates and silanes, have been suggested for use with silica fillers when such fillers are incorporated into polymeric compositions, e.g., rubber, in order to improve the performance of the rubber vulcanizate.

U.S. Pat. No. 5,116,886 describes a two-step process in which the surface of natural or synthetic, oxide or silicate fillers is modified by using certain organosilicon compounds. In the first step, the organosilicon compound is mixed intensely with the filler at a temperature below 60° C. In the second step, the homogenous mixture is subjected to a temperature of from 60 to 160° C. to complete the surface modification of the filler.

U.S. Pat. No. 5,908,660 also describes a two-step method for the preparation of hydrophobic silica. In the first step, an aqueous suspension of precipitated silica is contacted with an organosilicon compound in the presence of a catalytic amount of an acid to effect hydrophobing of the precipitated silica. In the second step, the aqueous suspension of the hydrophobic precipitated silica is contacted with a water-immiscible organic solvent at a solvent to silica weight ratio greater than 5:1 to effect separation of the hydrophobic precipitated silica from the aqueous phase.

U.S. Pat. No. 6,051,672 describes a method for making hydrophobic non-aggregated colloidal silica. The method comprises reacting an aqueous suspension of hydrophilic non-aggregated colloidal silica having an average particle diameter greater than about 4 nm with a silicon compound at a pH less than about pH 4 in the presence of a sufficient quantity of a water-miscible organic solvent to facilitate contact of the hydrophilic non-aggregated colloidal silica with the silicon compound. The method is conducted at a temperature within a range of about 20° C. to 250° C. for a period of time sufficient to form a hydrophobic non-aggregated colloidal silica. The hydrophobic non-aggregated colloidal silicas prepared by the present method are particularly useful as fillers in silicone compositions such as adhesives, rubbers, and sealants.

SUMMARY OF THE INVENTION

It has now been discovered that the processes described in U.S. Pat. No. 5,908,660 and U.S. Pat. No. 6,051,672 may be improved and used to produce the modified silica filler of the present invention, having a pH of from about 5.0 to 10, by utilizing a certain combination of functionalizing and hydrophobing agents in an aqueous suspension of silica having a pH of 2.0 or less and treating the acidic aqueous suspension of modified silica fillers with acid neutralizing agents to increase the pH of the suspension to a range of from greater than 2.0 to 10.

As used herein, a functionalizing agent is a reactive chemical that can cause silica to be covalently bonded to the polymeric composition in which it is used. A hydrophobing agent is a chemical that can bind to or be associated with silica to the extent that it causes a reduction in the affinity for water of the silica while increasing the silica's affinity for the polymeric composition in which it is used.

It has also been found that polyorganosiloxanes in silicone compositions containing the modified silica fillers of the present invention, which have a pH of 5.0 to 10.0, show less decomposition than those in compositions containing lower pH silica fillers.

DETAILED DESCRIPTION OF THE INVENTION

This invention is a process for making modified silica filler comprising the steps of:

(A) contacting an acidic aqueous suspension of precipitated or colloidal silica, optionally in the presence of a surfactant and/or a water-miscible solvent, with a combination of:
(a) a functionalizing coupling agent, and
(b) an organometallic hydrophobing compound in a weight ratio of (a) to (b) of at least 0.001 to 1 to form an acidic aqueous suspension of chemically treated silica filler having a pH of 2.0 or less (B) treating the acidic aqueous suspension of the chemically treated filler with an acid-neutralizing agent to increase the pH of the suspension to a range of from greater than 2.0 to 10, and (C) recovering the chemically treated filler.

This invention is also modified silica filler that has a pH of from about 5.0 to 10.0, where the silica filler is made by the method of this invention. This invention is also a curable silicone elastomer composition comprising a polyorganosiloxane, the modified silica filler produced by the method of this invention, and a means of curing the polyorganosiloxane into an elastomer.

The silica used to make the modified silica filler of the present invention is a colloidal or precipitated silica of the type used to formulate polymeric compositions such as rubber.

The colloidal silicas useful in the present invention are hydrophilic and are non-aggregated, essentially spherical-shaped particles having an average particle diameter greater than about 4 nm (nanometer). By "non-aggregated", it is meant that the colloidal silica exists in aqueous suspension in large part as discrete spherical particles. Preferred is when the colloidal silica has an average particle diameter within a range of greater than about 4 nm to about 150 nm. Even more preferred is when the colloidal silica has an average particle diameter within a range of about 5 nm to 100 nm. The method of making the hydrophilic non-aggregated colloidal silica is not critical and can generally be any of those known in the art. For example, a silica hydrosol may be prepared by acidifying a sodium silicate mixture with subsequent stabilization of the silica particles by a method such as described in U.S. Pat. No. 6,051,672 to provide an essentially spherical-shaped, hydrophilic non-aggregated colloidal silica in an aqueous suspension.

The hydrophilic non-aggregated colloidal silica is added to the present method as an aqueous suspension. The concentration of colloidal silica in the aqueous suspension is not critical and can be varied within wide limits. To facilitate mixing and dispersion of the silicon compound in the method of the present invention it is generally preferred that the colloidal silica comprise about 1 weight percent to 50 weight percent of the aqueous suspension. More preferred is when the colloidal silica comprises about 5 weight percent to 20 weight percent of the aqueous suspension.

Preferably, the silica used to produce the modified silica filler of the present invention is precipitated silica and most preferably it is precipitated silica of the type commonly employed for compounding with rubber. Various commercially available silicas that may be considered for use in this invention include silicas commercially available from PPG Industries under the Hi-Sil trademark with the grad designations 132, 135, 233, 900, 928, 929, etc; silicas available from Degussa AG with, for example, designations VN2 and VN3, FK140, FK160 etc; and from Nippon silica designated Nipsil LP.

The precipitated silica used to produce the modified silica filler of the present invention may be produced, for example, by acidic precipitation from solutions of silicates, e.g., sodium silicate. The method of preparing the precipitated silica is not limiting on the present invention and will depend upon the desired properties of the silica, such as surface area and particle size required for a given application. Any of the art recognized methods can be used.

The BET surface area of the precipitated silica used in preparing the modified silica of the present invention will generally be within a range of from 50 $m^2/g$ to 1000 $m^2/g$, and will preferably be within a range of from 100 $m^2/g$ to 500 $m^2/g$.

The precipitated silica used to form the modified silica may be in the form of an aqueous suspension from production stages that precede the drying step, such as a slurry formed during precipitation or as a reliquefied filter cake. The suspension can also be formed by re-dispersing dried silica into an aqueous and/or organic solvent. The concentration of hydrophilic precipitated silica in the aqueous and/or organic suspension is not critical and can be within a range of about 1 to 90 weight percent. Preferably, the concentration of hydrophilic precipitated silica is within a range of from 1 to 50 weight percent, and more preferably within a range of from 1 to 20 weight percent.

The acid used in step (A) may be of many types, organic and/or inorganic. The preferred acid catalyst is inorganic. Examples of suitable acid catalysts include hydrochloric acid, hydrobromic acid, hydroiodic acid, sulfuric acid, nitric acid, phosphoric acid, and benzenesulfonic acid. One acid catalyst or a mixture of two or more acid catalysts may be employed as desired. When the organometallic reactant is, for example, a chlorosilane, the catalytic amount of the acid may be generated in situ by hydrolysis of the chlorosilane or the reaction of the chlorosilane directly with hydroxyls of the silica. Sufficient acid is used to lower the pH of the aqueous solution of step (A) to 2.0 or less.

The temperature at which step (A) is conducted is not critical and is usually within the range of from 20° C. to 250° C., although somewhat lesser or somewhat greater temperatures may be used when desired. The reaction temperature will depend on the reactants used, e.g., the organometallic compound(s), the acid and, if used, a co-solvent. Preferably, step (A) is conducted at temperatures in the range of from 30° C. to 150° C., although Step (A) can be conducted at the reflux temperature of a slurry used in step (A) when this is desired.

The initial step of contacting the acidic aqueous suspension of silica with a combination of functionalizing coupling agent and organometallic hydrophobing compound, preferably a hydrophobing organosilicon compound, may further include adding a water miscible solvent in amounts sufficient to facilitate their reaction with the silica. The solvent acts as a phase transfer agent speeding up the interaction of the combination of hydrophobic functionalizing coupling agent and organometallic hydrophobing compound with the hydrophilic silica. When used, the amount of the water-miscible organic solvent will typically comprise at least 5 weight percent of the aqueous suspension, more preferably from 15 to 50 weight percent and most preferably from 20 to 30 weight percent of the aqueous suspension or the weight percent may range between any combinations of these values, inclusive of the recited values. Suitable water-miscible solvents include, for example, alcohols such as ethanol, isopropanol and tetrahydrofuran. Preferably, isopropanol is used as the water-miscible organic solvent.

A surfactant may also be used in the initial step, either in combination with the water-miscible organic solvent or in place of the water-miscible organic solvent, in an amount sufficient to facilitate the chemical modification of the silica by the functionalizing coupling agent and organometallic hydrophobing compound. The surfactant may be nonionic, anionic, cationic, amphoteric, or a mixture of such surfactants provided that it does not have an adverse effect on the performance of the resulting chemically modified silica for its intended use. Typically, when used, the surfactant is employed at a level of from 0.05 to 10 weight percent of the aqueous suspension; more preferably, from 0.1 to 5 weight percent, and most preferably from 0.1 to 3 weight percent or the weight percent may range between any combinations of these values, inclusive of the recited values.

Representative examples of suitable surfactants include alkylphenolpolyglycol ethers, e.g., p-octylphenolpolyethyleneglycol (20 units) ether, p-nonylphenolpolyethyleneglycol (20 units) ether, alkylpolyethyleneglycol ethers, e.g., dodecylpolyethyleneglycol (20 units) ether, polyglycols, e.g., polyethyleneglycol 2000, alkyltrimethylammonium salts, e.g., cetyltrimethylammonium chloride (or bromide), dialkyldimethylammonium salts, e.g., dilauryldimethylammonium chloride, alkylbenzyltrimethylammonium salts, alkylbenzenesulfonates, e.g., sodium p-dodecylbenzenesulfonate, sodium p-nonylbenzenesulfonate, alkylhydrogen sulfates, e.g., lauryl hydrogen sulfate, and alkyl sulfates, e.g., lauryl sulfate. The surfactant may also be, for example, a polysiloxane polymer or copolymer having an allyl endblocked polyethylene oxide.

The functionalizing coupling agent (a) of the present invention is a reactive chemical that can cause silica to be covalently bonded to the silicone composition in which it is used. The functionalizing coupling agent (a) has the general structure:

$$R_a R'_b SiX_{4-a-b} \quad (I)$$

where each R is independently selected from the group consisting of organofunctional hydrocarbon radicals comprising 1 to about 12 carbon atoms, wherein the organofunctional group is selected from vinyl, allyl, hexenyl, epoxy, glycidoxy, or (meth)acryloxy; each R' is independently selected from a hydrocarbon group from 1 to 18 carbon atoms or hydrogen, each X is independently selected from the group consisting of halogen and alkoxy radicals comprising 1 to about 12 carbon atoms, a=0, 1, 2, or 3, b=0, 1, or 2, a+b=1, 2, or 3, with the proviso that when b=1 then a+b=2 or 3. Preferably, the R and R' groups are selected so that they can react with functional groups on the polyorganosiloxane in silicone compositions of the present invention.

Examples of functionalizing coupling agents useful in the present polyorganosiloxane in a curable silicone polymeric composition invention include, but are not limited to allylmethyldichlorosilane, divinylpropoxysilane, vinyldimethylchlorosilane, vinylmethyldichlorosilane, vinylmethyldimethoxysilane, vinyldimethylmethoxysilane, hexenylmethyldichlorosilane, and hexenyldimethylchlorosilane.

The organometallic hydrophobing compound (b) used to make the modified filler of the present invention is an organometallic hydrophobing compound or a mixture of organometallic hydrophobing compounds selected from the group consisting of organometallic compound(s) represented by formula II:

$$R^1_{a''} MX_{(4-a'')} \quad II$$

organometallic compound(s) represented by formula III:

$$R^2_{2c+2} Si_c O_{(c-1)} \quad III$$

organometallic compound(s) represented by the formula IV:

$$R^3_{2d} Si_d O_d \quad IV$$

and organometallic compound(s) represented by formula V:

$$(R^2_3 Si)_k NR^4_{(3-k)} \quad V$$

wherein each M is independently silicon, titanium or zirconium; each $R^1$ can be a saturated monovalent hydrocarbon group or a substituted or non-substituted monovalent hydrocarbon group from 1 to 12 carbon atoms, or $R^1$ can be an organofunctional hydrocarbon group of from 1 to 12 carbon atoms where, for example the functionality is amino, carboxylic acid, carbinol ester, amido, mercapto, sulfido, disulfido, or polysulfido; Each X is independently selected from the group consisting of halogen, amino, alkoxy groups of from 1 to 12 carbon atoms and acyloxy groups of from 1 to 12 carbon atoms, a" is the integer 1, 2 or 3; each $R^2$ is independently halo, hydroxy, or a hydrocarbon group containing from 1 to 18 carbon atoms with the proviso that at least 50 mole percent of the $R^2$ substituents are hydrocarbon groups containing from 1 to 18 carbon atoms, c is an integer 2 to 10,000; each $R^3$ is independently halo, hydroxy, or a hydrocarbon group containing from 1 to 18 carbon atoms and d is an integer from 3 to 20; each $R^4$ is independently hydrogen or a hydrocarbon group containing from 1 to 18 carbon atoms, and k is 1 or 2; and the halogen (or halo) groups are selected from chloro, bromo, iodo or fluoro. In the definition of the substituents shown in formulae II, III, IV, and V, like symbols have the same meaning unless stated otherwise.

$R^1$ in formula II can be, for example, alkyl groups such as methyl, ethyl, propyl, iso-propyl, iso-butyl, t-butyl, n-butyl, pentyl, hexyl, heptyl, octyl, nonyl, decyl, and dodecyl; substituted alkyl group such as chloromethyl, 3,3,3-trifluoropropyl, and 6-chlorohexyl; cycloalkyl groups, such as cyclohexyl and cyclooctyl; aryl groups such as phenyl and naphthyl; and substituted aryl groups such as benzyl, tolyl and ethylphenyl.

When X is a halogen in formula II, it is preferred that the halogen be chloro. When X is an alkoxy group, X may be, for example, methoxy, ethoxy, and propoxy. When X is an acyloxy group, X may be, for example, acetoxy. More preferred is when each X is selected from the group consisting of chloro and methoxy.

In formulae III, IV, and V each $R^2$, $R^3$, and $R^4$ can be the same as the hydrocarbon groups described for $R^1$. For purposes of the present invention, when the organometallic reactant is an organosilicon reactant, the silicon is considered to be a metal.

Preferably, the organometallic hydrophobing compound (s) is represented by formulae II, III, IV, V, or a mixture of said organometallic compounds wherein each M is silicon. More preferably, the organometallic hydrophobing is represented by formula II wherein $R^1$ is $C_1$–$C_6$ alkyl, X is chloro and a" is 2.

Examples of useful organosilicon compounds include, but are not limited, to compounds selected from the group consisting of diethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, octamethylcyclotetrasiloxane, hexaethyldisiloxane, pentylmethyldichlorosilane, trimethylchlorosilane, trimethylmethoxysilane, trimethylethoxysilane, methyltrichlorosilane, methyltrimethoxysilane, dimethyltriethoxysilane, hexamethyldisiloxane, dimethylchlorosilane, dimethyldichlorosilane, dimethyldimethoxysilane, dimethyldiethoxysilane, hexamethyldisilazane, mercaptopropyltrimethoxysilane, 3,3'-bis(triethoxysilylpropyl)disulfide, polydimethylsiloxanes comprising 3 to about 20 dimethylsiloxy units and mixtures thereof.

Examples of organotitanium compounds that may be used, but are not limited to, tetra($C_1$–$C_{18}$)alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, [Ti(CH$_2$Ph)$_3$(NC$_5$H$_{10}$)] and [Ti(CH$_2$SiMe$_3$)$_2$(NEt$_2$)$_2$].

Examples of organozirconium compounds that may be used, but are not limited to, tetra($C_1$–$C_{18}$)alkoxy zirconates phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv). Zirconium compounds similar to those described above for the organotitanium compounds and vice-versa are also contemplated.

The functionalizing coupling agent and organometallic hydrophobing compound may be added together or sequentially in any order. It is preferred that the functionalizing coupling agent and organometallic hydrophobing compound be added in an amount that provides an excess of organometallic units in relation to the hydroxyl groups available on the silica particles for reaction. The upper limit of the total amount of organometallic reactants added to the process is not critical. Excess functionalizing coupling agent and organometallic compound can be removed by filtration, distillation, washing with a solvent, or other known separation techniques.

The modified silica filler of the present invention may be prepared by using the method for preparing hydrophobic precipitated silica and colloidal silica disclosed in U.S. Pat. Nos. 5,908,660 and 6,051,672, respectively, which disclosures are incorporated herein by reference, with the following changes. The amount of acid used results in a pH of 2.0 or less in the aqueous suspension, preferably, a pH of 1.0 or less and more preferably a pH of 0.5 or less; the modifying chemical used is a combination of functionalizing coupling agent and a hydrophobing organometallic compound, in a weight ratio of the functionalizing coupling agent to the organometallic hydrophobing compound of at least 0.001:1, preferably from 0.001:1 to 10:1, more preferably, from 0.01:1 to 5:1, and most preferably, from 0.05:1 to 2:1, or the weight ratio may range between any combination of these values, inclusive of the recited values; and after the chemical treatment reaction is completed, the acidity (either added or generated in situ by the hydrolysis of halogenated organometallic compounds) is neutralized to raise the pH. The neutralizing agents can be of any type typically used to increase the pH of an acidic solution as long as the properties of the modified silica filler are not adversely affected. Suitable neutralizing agents include sodium hydroxide, potassium hydroxide, ammonium hydroxide and sodium bicarbonate. Neutralization of the modified silica filler may also be accomplished by adding gaseous ammonia to the aqueous solution during spray drying.

After the chemical modifying process is completed, the pH of the aqueous suspension of modified silica is increased from the treatment pH of 2.0 or less to a pH from greater than 2.0 to 10.0. Typically, the pH of the resulting aqueous suspension is increased to 3 or higher, preferably, 4 or higher, more preferably, 5 or higher and most preferably, 6 or higher and usually 10 or less, preferably 9 or less, more preferably 8 or less and most preferably 7 or less. This is done to neutralize the added or generated acidity and produce a recovered, modified silica filler having a pH of from about 5.0 to 10.0, preferably 5.0 to 9.0, more preferably 6.0 to 8.0, most preferably 6.5 to 7.5.

The modified silica is recovered by filtering and drying or by contacting the aqueous suspension of modified silica with a water immiscible organic solvent at a solvent to silica weight ratio greater than 1 to 1, preferably greater than 5 to 1. The modified silica recovered in the solvent phase may be used without further treatment or dried. One contemplated embodiment of the present invention is a composition comprising a slurry of the modified silica filler in a water-immiscible solvent. The concentration of the modified silica filler in the slurry may range from 1 to 90 weight percent based on the total weight of the slurry.

Examples of useful water-immiscible organic solvents include low molecular weight siloxanes, such as hexamethyldisiloxane, octamethylcyclotetrasiloxane, diphenyltetramethyldisiloxane and trimethylsiloxy endblocked polydimethylsiloxane fluids. When a siloxane is employed as a solvent, it may serve both as a solvent and as a reactant with the silica. In addition, useful water-immiscible organic solvents include aromatic hydrocarbons, such as toluene and xylene; heptane and other aliphatic hydrocarbon solvents; cycloalkanes, such as cyclohexane; ethers, such as diethylether and dibutylether; halohydrocarbon solvents, such as methylene chloride, chloroform, ethylene chloride, and chlorobenzene; and ketones, such as methylisobutylketone.

The amount of modified silica filler that may be used in silicone polymeric composition may range from 5 up to 70 weight percent, based on the total weight of the polymeric composition. In particular, the chemically modified silicas are especially useful in curable silicone elastomer compositions. The use of the modified silica fillers of the present invention in curable silicone elastomer compositions reduces the amount of silicone polymer depolymerization that may occur with more acidic silica fillers. The amount of silicone polymer decomposition in uncured silicone compositions decreases as the pH of the modified silica of the present composition increases.

Curable silicone elastomer compositions are well known in the art. The silicone compositions of the present invention comprise mixtures of curable polyorganosiloxane, silica, and a means of curing the polyorganosiloxane into an elastomer. Curable silicone elastomers may have consistency ranging from a viscous liquid to a gum-like consistency. Once the curing means is activated by a suitable means such as heat, moisture, or radiation, the curable silicone elastomer becomes a cured elastomer. Examples of silicone rubber are given in U.S. Pat. No. 5,009,874 at column 5, line 27 through column 6, line 23, the disclosure of which is, in its entirety, incorporated herein by reference.

Curable polyorganosiloxanes are also well known in the art, and comprise polysiloxanes having primarily diorganosiloxane units but which may also contain small amounts of triorganosiloxane, mono-organosiloxane, and $SiO_2$ units. The preferred curable polyorganosiloxanes are those that are substantially linear in nature and have a ratio of organic substituents to silicon atoms within the range of about 1.98:1 to 2.01:1.

The organic groups on the curable polyorganosiloxane can be monovalent hydrocarbon radicals or monovalent halogenated hydrocarbon radicals. Examples of such radicals are alkyl radicals, e.g. methyl, ethyl, propyl, octyl, and octadecyl; alkenyl radicals e.g. vinyl, and allyl; aryl, aralkyl, and alkaryl radicals e.g. phenyl, phenylethyl, benzyl, and tolyl; and fluroalkyl radicals e.g. 3,3,3-trifluoropropyl. Preferably, at least 50 percent of the total radicals substituted on the silicon atom are methyl radicals with any remaining radicals being selected from phenyl, vinyl, and 3,3,3-trifluoropropyl. When alkenyl radicals are present in the curable polyorganosiloxane such radicals preferably comprise less than about 0.5% of the total organic groups. Small proportions of functional radicals such as hydroxyl, acyloxy, and oximo may also be present, especially in terminal siloxane units. Such functional radicals will normally be present when the curable elastomer composition is of the so-called room temperature vulcanizing type, or sealant.

The curable polyorganosiloxanes may be homopolymers or copolymers and may vary in consistency from viscous liquids to stiff, high molecular weight gums. Examples of curable polyorganosiloxanes which may be employed in the process of this invention therefore include polydimethylsiloxane, poly (3,3,3-trifluoropropyl) methylsiloxanes, copolymers of dimethylsiloxane units and vinylmethylsiloxane units and diphenylsiloxane units. As stated above, the copolymers may be terminated with functional radicals e.g. hydroxyl. They may, however, be terminated with any desired siloxane unit, for example trimethylsiloxane units, vinyldimethylsiloxane units and vinylmethylphenylsiloxane units. Except to the extent it may form part of the curing mechanism the particular type of terminal unit is not critical.

The curing means can be any of the well-known curing means known in the silicone elastomer art. The chemically modified silicas of the present invention will work with any curing means selected. For example, the curable silicone elastomer compositions of this invention may be converted to the elastomeric state by exposure to high-energy radiation or by the use of a heat activated curing agent. Examples of the latter include benzoyl peroxide, dicumyl peroxide, tertiary butyl peracetate, tertiary butyl perbenzoate, monochlorobenzoyl peroxide, 2,4-dichlorobenzoyl peroxide, and tertiary butyl cumyl peroxide.

Yet another curing method is where the curable silicone elastomer composition is cured by crosslinking the polyorganosiloxane with an organohydrogensiloxane crosslinker in the presence of a platinum group metal-containing catalyst. The polyorganosiloxane has at least two silicon-bonded alkenyl groups, preferably vinyl groups per polymer molecule. The organohydrogensiloxane crosslinker contains an average of at least two silicon-bonded hydrogen atoms per molecule, and no more than one silicon-bonded hydrogen atom per silicon atom, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cycloalkyls such as cyclohexyl; aryls such as phenyl and tolyl; and halogen substituted alkyls such as 3,3,3-trifluorpropyl and perfluoropropyl. The platinum group metal-containing catalyst can be any such catalyst that is known to catalyze the reaction of silicon-bonded hydrogen atoms with silicon-bonded vinyl groups. By platinum group metal, it is meant ruthenium, rhodium, palladium, osmium, iridium, and platinum.

Also applicable is the room-temperature vulcanizing mechanism, frequently used for silicone sealants, wherein the polyorganosiloxane contains functional radicals, e.g. hydroxyl, oximo, alkoxy, or acyloxy and curing takes place in the presence of moisture at normal or slightly elevated temperatures with or without the addition of a crosslinking agent and a condensation catalyst. When a crosslinker is used, it is typically an organosilicon compound having at least two or, preferably, three hydrolyzable groups bonded to the silicon atom or atoms in the molecule. Examples of the organosilicon compounds include compounds such as triacetoxy silane, alkoxy silane compounds, e.g. methyl trimethoxy silane, vinyl trimethoxy silane, methyl triethoxy silane, vinyl triethoxy silane, ethyl orthosilicate, and propyl orthosilicate; alkenyloxy silane compounds, e.g. methyl tripropenyloxy silane and vinyl tri (isopropenyloxy) silane; oxime silane compounds, e.g. methyl tri (acetonoxime) silane and methyl tris (butanonoxime) silane; amino-containing silane compounds, e.g. methyl tris (dimethylamino) silane and methyl tris (diethylamino) silane; amido-containing silane compounds, e.g. methyl tris (N-methyl acetamido) silane and vinyl tris (N-ethyl acetamido) silane; aminoxy-containing silane compounds, e.g. methyl tris(dimethylaminoxy) silane and methyl tris (diethlyaminoxy) silane. The condensation catalyst can be any known in the art to facilitate crosslinking in silicone compositions.

Other conventional additives used in silicone elastomers in the art can also be used in the curable silicone elastomers of the present invention. Such additives include other fillers, such as carbon black, oils, plasticizers, accelerators, antioxidants, heat stabilizers, light stabilizers, zone stabilizers, extenders and coloring pigments.

EXAMPLES

The following examples are provided to illustrate the present invention and are not intended to limit the scope of the claims. These examples define the need for and use of neutralization in the treatment process to prevent the depolymerization of the polymer base and the use of treated precipitated silicas in silicone elastomer applications. Stability of the base to depolymerization prior to cure is critical for storage stability and consistent performance.

Example 1

This example establishes that there is a problem with low pH filler causing the depolymerization of silicone base materials prior to curing to elastomers. The comparison is made between a series of silica samples with a variety of pH values. The effect of the different pH values of the silica on the depolymerization of the bases is elucidated.

Filler Preparation

Treated silica fillers were prepared in a series of scale-up reactions using a 30 gallon glass lined reactor with a variable speed drive impeller. In a typical run, the reactor was charged with about 34 kg of silica slurry (PPG 320, PPG Industries Inc., 4% aqueous slurry of precipitated silica having a nitrogen BET surface area of 320 $m^2/g$) to which was added about 10 kg of isopropanol. An excess, based on the amount of hydroxyl sites on the silica, of dimethyldichlorosilane or a combination of 92% dimethyldichlorosilane with 8% methylvinyldichlorosilane was slowly added to the reactor with stirring. The reaction mixture was heated to 65C. for 30 minutes, cooled to room temperature, and about 18 kg of solvent added (hexamethyldisiloxane (HMDS) or toluene) with mild stirring. The aqueous layer was then drained off and the organic phase neutralized by the addition of a base (NaHCO$_3$ or NaOH) premixed with water. Following base addition, the mixture was agitated again and then the aqueous layer drained off. Following the neutralization step, water was used to wash the mixture. Treated silicas were dried using a rotary cone drier. In Table 1 are shown the fillers with the organic solvent used to transfer the treated particles, the base used for neutralization and whether or not there was 8% vinylmethyldichlorosilane included in the silane treatment. As is shown in Table 2, the neutralization procedures resulted in treated particles with a range of pH values.

TABLE 1

Silica Treatment Conditions

| Filler Number | Pop-out Solvent | Neutralizing Agent | % Vinyl in treatment |
|---|---|---|---|
| Filler 1 | HMDS | NaHCO3 | 0 |
| Filler 2 | Toluene | NaHCO3 | 8 |
| Filler 3 | Toluene | NaHCO3 | 8 |
| Filler 4 | Toluene | NaOH | 0 |

Silicone Rubber Base Preparation

Silicone rubber base consisted of a mixture of silicone polymers with treated filler. In a typical base preparation, a dough-type mixer was charged with a mixture of POLYMER 1, a vinyl terminated polydimethylsiloxane polymer ($Mn=320,000$, $Mw=620,000$) and POLYMER 2 vinyl pendant and terminated polydimethylsiloxane with 0.0654 weight percent vinyl groups of similar molecular weight. To the polymer mixture was added 25% of the total silica mixture to be added. The silica and polymer were compounded until the silica was incorporated. Further addition of silica and compounding was repeated in 25% silica increments until all the silica was added. Following the addition and incorporation of the last silica, the base was allowed to mix for an additional 15 minutes. The compositions of the polymer mix are included in Table 2.

Method of Determination of Decrease in Mn and Mw

Into 9.95 g of toluene was added 0.05 g of silicone base or polymer mix. Following complete solvation or dissolution of the base polymers, gel permeation chromatography was done on the solution to determine the number average and weight average molecular weights, Mn and Mw respectively. Changes in molecular weight due to base instability were calculated by subtracting the Mn or Mw of the base containing the filler from the Mn or Mw of the initial polymer mixture and dividing by the Mn or Mw of the initial polymer to determine a percentage loss in Mn or Mw.

Method for the pH of the Filler

To determine the pH of the treated and dried fillers, the filler was added to a 50/50 weight percent methanol to water mixture to a concentration of 4 weight percent silica to weight of methanol/water mixture. This slurry was well mixed and the pH determined by standard pH probe techniques.

Table 2 below shows the series of bases prepared with different treated precipitated silicas, the corresponding pH of the filler used and the decreases in both the number average, Mn and weight average, Mw, molecular weights of the silicone bases.

Table 3 shows that the treated fillers, when cured into silicone elastomers, give typical silicone rubber properties as compared to a standard silicone rubber base filled with fumed silica. In these preparations, the base material prepared as described above was mixed on a two-roll mill with a peroxide cure catalyst 2,5 bis(tert-butylperoxy) 2,5-dimethylhexane in a typical ratio of 314 g of base to 0.82 g 2,5 bis(tert-butylperoxy) 2,5-dimethylhexane. The elastomer formulation was then formed and cured in a hot press at 177 C. for 10 min.

TABLE 2

Depolymerization Data for a Series of Treated silicas of Different pH

| Sample Number | Silica Mix Used | Silica pH | % Decrease in Mn | % Decrease in Mn | Filler Loading Wt % | Polymer mix |
|---|---|---|---|---|---|---|
| 1-1 | Filler 1 | 3.75 | 81.64 | 83.63 | 40 | 100% Polymer 1 |
| 1-2 | 50/50 Filler 1/Filler 2 | 3.84 | 87.7 | 89.36 | 40 | 50/50 Polymer 1/ Polymer 2 |
| 1-3 | 100% Filler 3 | 4.46 | 51.23 | 60.94 | 40 | 50/50 Polymer 1/ Polymer 2 |
| 1-4 | 100% Filler 4 | 7.88 | 29.5 | 39.26 | 40 | 50/50 Polymer 1/ Polymer 2 |
| 1-5 | 100% Filler 3 | 4.46 | 57.66 | 67.84 | 40 | 50/50 Polymer 1/ Polymer 2 |
| 1-6 | 100% Filler 4 | 7.88 | 30.25 | 36.53 | 40 | 50/50 Polymer 1/ Polymer 2 |
| 1-7 | 70/30 Filler 3/Filler 4 | 6.17 | 52.79 | 61.14 | 40 | 50/50 Polymer 1/ Polymer 2 |
| 1-8 | 20/80 Filler 1/Filler 2 | 3.80 | 90.29 | 90.28 | 50 | 20/80 Polymer 1/ Polymer 2 |
| 1-9 | 20/80 Filler 1 /Filler2 | 3.80 | 64.88 | 72.27 | 38.4 | 40/60 Polymer 1/ Polymer 2 |
| 1-10 | 100% Filler 3 | 4.46 | 60.15 | 68.68 | 40 | 50/50 Polymer 1/ Polymer2 |

TABLE 2-continued

Depolymerization Data for a Series of Treated silicas of Different pH

| Sample Number | Silica Mix Used | Silica pH | % Decrease in Mn | % Decrease in Mn | Filler Loading Wt % | Polymer mix |
|---|---|---|---|---|---|---|
| 1-11 | 100% Filler 4 | 7.88 | 26.92 | 36.66 | 40 | 50/50 Polymer 1/ Polymer 2 |

TABLE 3

Mechanical Properties of Silicone Elastomers of Example #1

| Sample | Durometer, Shore A | Tensile, psi | Elongation, % | 100% Mod., psi | Tear B ppi |
|---|---|---|---|---|---|
| 1-1 | 47.4 | 1366 | 660 | 140 | 104 |
| 1-2 | 54.7 | 1099 | 537 | 222 | 185 |
| 1-3 | 68.4 | 1038 | 344 | 379 | 125 |
| 1-4 | 60.3 | 1297 | 501 | 236 | 122 |
| Control | 48 | 1234 | 539 | 128 | — |

Control = Standard silicone rubber containing 100 parts Polymer 2, 38 parts fumed silica filler (Cabot MS75D, Cabot Corporation)

Example #2

This example shows the improvement in the process by including a neutralization step by comparing neutralized to non-neutralized samples. Neutralization was done to various pH levels.

Filler Preparation

For all four fillers listed in Table 4, the following general procedure was followed for the silica slurry treatment step. A precipitated silica slurry, (PPG 321, PPG Industries Inc., 4.5% silica solids in water, 320 m$^2$/g nitrogen BET particle surface area) was heated to about 85 C. For samples 2-3 and 2-4, additional HCl was added to the slurry to reduce the pH and better enhance surface treatment (see Table 4). Using an in-line mixing chamber, the silica slurry was mixed with dimethyldichlorosilane at different silane to slurry ratios depending on the targeted surface treatment level (see Table 4). Work up of the different silica samples was as follows:

Sample 2-1: The treated slurry was not neutralized but was filtered, washed and spray dried using a Niro Atomizer.

Sample 2-2: The treated slurry was neutralized to a slurry pH of 4.15 by addition of 29.74 g of NaOH dissolved in 500 ml of deionized water. The neutralized slurry was then filtered, washed and spray dried using a Niro Atomizer.

Sample 2-3: The treated slurry was neutralized to a slurry pH of 6.1 using aqueous NaOH, filtered, washed and spray dried.

Sample 2-4: The treated slurry was partially neutralized to a slurry pH of 2.01, filtered, washed and dried.

Base Preparation

In these typical base preparations, a rotary mixer with a small bowl was charged with POLYMER 2, a vinyl terminated and vinyl pendant polydimethylsiloxane polymer (Mn=320,000, Mw=620,000) with 0.0654 weight percent vinyl groups. To the polymer mixture was added small aliquots of the modified silica filler until all of the silica was incorporated. Loading levels were about 35% by weight silica in polymer. Following complete addition of the filler, the mixer was then allowed to continue mixing for a few minutes. Compositions of the four bases were similar.

Elastomer Preparation

In these preparations, the base material prepared as described above was mixed on a two-roll mill with a peroxide cure catalyst 2,5 bis(tert-butylperoxy) 2,5-dimethylhexane in a typical ratio of 314 g of base to 0.82 g 2,5 bis(tert-butylperoxy) 2,5-dimethylhexane. The elastomer formulation was then formed and cured in a hot press at 177 C. for 10 min.

Method of Determination of Decrease in Mn and Mw in the Base

The method for determination of the decrease in Mn and Mw was the same as used in Example 1. The value used for Polymer 2, was Mn=320,000 and Mw=620,000

Method for Determining the pH of the Filler

The method for determination of the pH of these fillers was the same as described in Example #1.

TABLE 4

Neutralized and Non-neutralized Filler Treatment

| Sample Number | Neutralize | Silica pH | Dimethyl- dichloro silane/Slurry | Decrease in Mn, % | Decrease in Mw, % | HCl added to slurry |
|---|---|---|---|---|---|---|
| 2-1 | No | 4.67 | 45 cc/2500 g | 72.36 | 63.23 | 0 |
| 2-2 | Yes | 6.39 | 45 cc/2500 g | 28.31 | 28.53 | 0 |
| 2-3 | Yes | 7.47 | 62 cc/2500 g | 12.13 | 9.47 | 0.79 moles |
| 2-4 | Yes | 5.23 | 62 cc/2500 g | 34.16 | 27.27 | 0.82 moles |

Standard properties of tensile strength, elongation, 100% modulus, Tear B and C, specific gravity and compression set were determined on the elastomers and bases using techniques well established in the art.

Table 5 shows the mechanical properties of elastomers formed from all four silicas of Example 2. These data show that good silicone elastomers can be formed from these materials.

TABLE 5

Mechanical Properties of Silicone Elastomers of Example #2

| Sample | Durometer, Shore A | Tensile, psi | Elongation, % | 100% Modulus, psi | Tear B, ppi |
|---|---|---|---|---|---|
| 2-1 | 63.5 | 1111 | 549 | 157 | 111 |
| 2-2 | 61.7 | 1034 | 508 | 154 | 72 |
| 2-3 | 62.0 | 840 | 429 | 250 | 63 |
| 2-4 | 60.3 | 1079 | 543 | 169 | 69 |
| Control | 48 | 1234 | 539 | 128 | — |

Control = Standard silicone rubber containing 100 parts Polymer 2, 38 parts fumed silica filler (Cabot MS756D)

Although the present invention has been described with references to specific details of certain embodiments thereof, it is not intended that such details should be regarded as limitations upon the scope of the invention except in so far as they are included in the claims.

We claim:

1. A process for making a modified silica filler having a pH from about 5 to 10 comprising:
   (A) contacting an acidic aqueous suspension, of precipitated or colloidal silica, optionally in the presence of a surfactant and/or a water-miscible solvent, with a combination of
      (a) a functionalizing coupling agent of the general formula: $R_aR'_bSiX_{4-a-b}$, where each R is independently selected from the group consisting of organofunctional hydrocarbon radicals comprising 1 to about 12 carbon atoms, wherein the organofunctional group is selected from vinyl, allyl, hexenyl, epoxy, glycidoxy, or (meth)acryloxy; each R' is independently selected from a hydrocarbon group of from 1 to 18 carbon atoms or hydrogen; each X is independently selected from the group consisting of halogen and alkoxy radicals comprising 1 to about 12 carbon atoms, a=0, 1, 2, or 3, b=0 or 1, a+b=1, 2, or 3, with the proviso that when b=1 then a+b=2 or 3, and
      (b) an organometallic hydrophobing compound in a weight ratio of (a) to (b) of at least 0.001 to 1 to form an acidic aqueous suspension of modified silica filler having a pH of 2.0 or less;
   (B) treating the acidic aqueous suspension of the chemically modified filler with an acid-neutralizing agent to increase the pH of the suspension to a range of from greater than 2.0 to 10;
   (C) recovering the modified silica filler.

2. The process of claim 1 where the acidic aqueous suspension of step (A) comprises 1 to 20 weight % precipitated silica having a BET surface area in a range from about 100 m²/g to 500 m²/g.

3. The process of claim 1 where the acidic aqueous suspension of step (A) comprises 5 to 20 weight % of a colloidal silica having a diameter of 5 nm to 100 nm.

4. The process of claim 1 where the acidic aqueous suspension of step (A) comprises 20 to 30 weight % of a water miscible solvent.

5. The process of claim 1 where the acidic aqueous suspension of step (A) comprises 0.1 to 3 weight % of a surfactant.

6. The process of claim 1 where the functionalizing coupling agent is selected from the group consisting of allylmethyldichlorosilane, divinylpropoxysilane, vinyldimethylchlorosilane, vinylmethyldichlorosilane, vinylmethyldimethoxysilane, vinyldimethylmethoxysilane, hexenylmethyldichlorosilane, and hexenyldimethylchlorosilane.

7. The process of claim 1 wherein the organometallic hydrophobing compound(s) is selected from the group consisting of organometallic compound(s) represented by formula II:

$$R^1_aMX_{(4-a)} \qquad \text{II}$$

organometallic compound(s) represented by formula III:

$$R^2_{2c+2}Si_cO_{(c-1)} \qquad \text{III}$$

organometallic compound(s) represented by the formula IV:

$$R^3_{2d}Si_dO_d \qquad \text{IV}$$

organometallic compound(s) represented by formula V:

$$(R^2_3Si)_kNR^4_{(3-k)} \qquad \text{V}$$

and a mixture of said organometallic compound(s); wherein each M is independently silicon, titanium or zirconium; each $R^1$ is independently a hydrocarbon group of from 1 to 18 carbon atoms or $R^1$ is an organofunctional hydrocarbon group of from 1 to 12 carbon atoms wherein, said functionality is amino, carboxylic acid, carbinol ester, amido, mercapto, sulfido, disulfido or polysulfido; each X is independently selected from the group consisting of halogen, amino, alkoxy groups of from 1 to 12 carbon atoms and acyloxy groups of from 1 to 12 carbon atoms, a" is the integer 1, 2 or 3; each $R^2$ is independently halo, hydroxy, or a hydrocarbon group containing from 1 to 18 carbon atoms with the proviso that at least 50 mole percent of the $R^2$ substituents are hydrocarbon groups containing from 1 to 18 carbon atoms, c is an integer from 2 to 10,000; each $R^3$ is independently halo, hydroxy, or a hydrocarbon group containing from 1 to 18 carbon atoms and d is an integer from 3 to 20; each $R^4$ is independently hydrogen or a hydrocarbon group containing from 1 to 18 carbon atoms and k is 1 or 2; and said halo or halogen is selected from chloro, fluoro, bromo or iodo.

8. The process of claim 1 wherein the organometallic hydrophobing compound(s) is selected from the group consisting of diethyldichlorosilane, methylphenyldichlorosilane, phenylethyldiethoxysilane, 3,3,3-trifluoropropylmethyldichlorosilane, trimethylbutoxysilane, symdiphenyltetramethyldisiloxane, octamethylcyclotetrasiloxane, hexaethyldisiloxane, pentylmethyldichlorosilane, trimethylchlorosilane, trimethylmethoxysilane, trimethylethoxysilane, methyltrichlorosilane, methyltrimethoxysilane, methyltriethoxysilane, hexamethyldisiloxane, dimethylchlorosilane, dimethyldichlorosilane, dimethyldimethoxysilane, dimethyldiethoxysilane, hexamethyldisilazane, trivinyltrimethylcyclotrisilazine, mercaptopropyltrimethoxysilane, 3,3'-bis(triethoxysilylpropyl)disulfide, polydimethylcyclosiloxanes comprising 3 to about 20 dimethylsiloxy units, tetra ($C_1$–$C_{18}$)alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv)

triisopropoxide, phenyl titanium (iv) tributoxide, phenyl titanium (iv) triisobutoxide, [Ti(CH$_2$Ph)$_3$(NC$_5$H$_{10}$)] [Ti(CH$_2$SiMe$_3$)$_2$(NEt$_2$)$_2$], tetra(C$_1$–C$_{18}$)alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv) and mixtures of such organometallic compounds.

9. The process of claim 7 wherein the organometallic hydrophobing compound(s) is represented by formulae II, III, IV, V or a mixture of said organometallic compound(s) wherein each M is silicon and in formula II each R$^1$ is independently a hydrocarbon group of from 1 to 18 carbon atoms.

10. The process of claim 7 wherein the organometallic hydrophobing compound(s) is represented by formula II wherein R$^1$ is C$_1$–C$_6$ alkyl, X is chloro, a" is 2 and the silica is precipitated silica.

11. The process of claim 1 wherein the weight ratio of (a) to (b) is from 0.01:1 to 5:1.

12. The process of claim 1 wherein the weight ratio of (a) to (b) is from 0.05:1 to 2:1.

13. The process of claim 1 wherein the pH of the acidic suspension in step (A) is less than 1.0.

14. The process of claim 1 wherein the pH of the acidic suspension in step (A) is less than 0.5.

15. The process of claim 1 wherein the pH of the suspension in step (B) is increased to a range from about 4 to about 10.

16. The process of claim 1 wherein the pH of the suspension in step (B) is increased to a range from about 6 to about 7.

17. The process of claim 1 where the modified silica filler is recovered from the aqueous suspension by contacting the aqueous suspension with a water immiscible solvent at a solvent-to-silica weight ratio greater than about 1:1.

18. A modified silica filler made by the process of claim 1, wherein the modified silica filler has a pH of between 5.0 and 10.0.

19. A modified silica filler made by the process of claim 1, wherein the modified silica filler has a pH of between 5 and 9.

20. A modified silica made by the process of claim 1, wherein the modified silica filler has a pH between 6.5 and 7.5.

21. A modified silica made by the process of claim 6.

22. A modified silica made by the process of claim 10.

23. A curable silicone elastomer composition comprising a curable polyorganosiloxane, the modified silica filler of claim 18, and a means of curing the polyorganosiloxane into an elastomer.

24. The curable silicone elastomer of claim 23 where the polyorganosiloxane is selected from the group consisting of polydimethylsiloxane, poly(3,3,3-trifluoropropyl)methylsiloxanes, copolymers of dimethylsiloxane units and vinylmethylsiloxane units and diphenylsiloxane units.

25. The curable silicone elastomer of claim 23 where the means of curing the polyorganosiloxane is a heat activated curing agent selected from the group consisting of benzoyl peroxide, dicumyl peroxide, tertiary butyl peracetate, tertiary butyl perbenzoate, monochlorobenzoyl peroxide, 2,4-dichlorobenzoyl peroxide, and tertiary butyl cumyl peroxide.

26. The curable silicone elastomer of claim 23 where the polyorganosiloxane has at least two silicon-bonded alkenyl groups and the means of curing comprises an organohydrogen siloxane crosslinker and a platinum group metal-containing catalyst.

27. The curable silicone elastomer of claim 23 where the polyorganosiloxane contains functional radicals selected from hydroxyl, oximo, alkoxy, or acyloxy.

28. The curable silicone elastomer of claim 27 where the means of curing is exposure of the polyorganosilane to moisture.

* * * * *